United States Patent
Hendriks et al.

(10) Patent No.: US 6,930,973 B2
(45) Date of Patent: Aug. 16, 2005

(54) OPTICAL ELEMENT

(75) Inventors: Bernardus Hendrikus Wilhelmus Hendriks, Eindhoven (NL); Jorrit Ernst De Vries, Eindhoven (NL)

(73) Assignee: Koninklijke Phillips Electronics N.V., Eindhoven (NL)

(*) Notice: Subject to any disclaimer, the term of this patent is extended or adjusted under 35 U.S.C. 154(b) by 552 days.

(21) Appl. No.: 09/914,091

(22) PCT Filed: Dec. 19, 2000

(86) PCT No.: PCT/EP00/12989

§ 371 (c)(1),
(2), (4) Date: Aug. 21, 2001

(87) PCT Pub. No.: WO01/48746

PCT Pub. Date: Jul. 5, 2001

(65) Prior Publication Data

US 2003/0021216 A1 Jan. 30, 2003

(30) Foreign Application Priority Data

Dec. 24, 1999 (EP) .......................................... 99204521
Nov. 15, 2000 (EP) .......................................... 00204027

(51) Int. Cl.[7] .............................................. G11B 7/00
(52) U.S. Cl. ............................. 369/112.06; 369/112.11; 369/112.25
(58) Field of Search ...................... 369/112.11, 112.15, 369/112.22, 112.23, 112.25, 112.26, 112.28, 112.01, 112.03, 112.04, 112.05, 112.06, 112.07, 112.08, 112.1, 112.12, 112.13, 44.23

(56) References Cited

U.S. PATENT DOCUMENTS

| | | | |
|---|---|---|---|
| 5,835,283 A | 11/1998 | Yamanaka | 359/719 |
| 6,067,283 A * | 5/2000 | Muramatsu | 369/112.1 |
| 6,088,322 A * | 7/2000 | Broome et al. | 369/112.26 |
| 6,134,055 A * | 10/2000 | Koike | 359/724 |
| 6,201,780 B1 * | 3/2001 | Katayama | 369/112.19 |
| 6,205,108 B1 * | 3/2001 | Yamanaka | 369/112.2 |
| 6,275,461 B1 * | 8/2001 | Yoo et al. | 369/112.01 |
| 6,639,889 B1 * | 10/2003 | Yoo et al. | 369/112.26 |

FOREIGN PATENT DOCUMENTS

| | | |
|---|---|---|
| EP | 0865037 A1 | 9/1998 |
| EP | 0881634 A1 | 12/1998 |
| EP | 0936604 A1 | 8/1999 |
| WO | WO9733277 | 9/1997 |

* cited by examiner

*Primary Examiner*—Thang V. Tran
(74) *Attorney, Agent, or Firm*—Michael E. Belk

(57) ABSTRACT

An optical element (16) introduces a first wavefront deviation when a first radiation beam having a first wavelength passes through it and a second wavefront deviation when a second radiation beam having a second wavelength different from the first wavelength passes through it. One surface of the optical element comprises a phase structure in the form of annular areas (52, 53, 54, 55), the areas forming a non-periodic pattern of optical paths of different length. The optical paths for the first wavelength form the first wavefront deviation and the optical paths for the second wavelength form the second wavefront deviation, the difference between the two deviations being proportional to the difference between the first and second wavelength.

11 Claims, 4 Drawing Sheets

OPTICAL ELEMENT

The invention relates to an optical element for introducing a first wavefront deviation in a first radiation beam of a first wavelength and a second wavefront deviation in a second radiation beam of a second wavelength different from the first wavelength, the optical element having a surface in the path of the first and second radiation beam. The invention also relates to an optical head for scanning an optical record carrier having an information layer, the head comprising a radiation source for generating a radiation beam, and an objective system for converging the radiation beam to a focus on the information layer, the optical head comprising such an optical element.

Progress in the field of optical recording results in the regular market introduction of new more complex systems having extended capabilities, such as a higher information capacity and density. The price to pay for these extended capabilities is that the tolerance margins of the systems decrease. An example of such a new system is the Digital Video Recording system (DVR) which is a new optical recording system. The DVR system uses a radiation beam with wavelength of approximately 400 nm, a numerical aperture (NA) of 0.85 and a spherical aberration compensation for a record carrier of substrate of 0.1 mm. When this system is compared with the DVD (Digital Versatile Disk) system which uses a radiation beam with wavelength 650 nm, a numerical aperture of 0.6 and a record carrier substrate thickness of 0.6 mm, the increase in NA and the decreases in wavelength makes that the tolerance margins for DVR are smaller than for DVD. The DVR system, capable of recording 22.5 GB discs, is for instance more sensitive for wavelength variations which may arises when the temperature of the laser is changed, the laser is switched from reading to writing power, or the particular laser differs from the average laser of a batch of lasers and emits at a wavelength different from the wavelength of the average laser.

The unwanted aberrations arising when the wavelength varies in a certain range can be reduced using a structure based on notched lenses, as described in the article Optics and Spectroscopy, volume 6 (1959) pp. 126–133 by A. Tudorovskii. Each step in such a notched lens introduces a phase step in the wavefront of the transmitted beam equal to an integer multiple of $2\pi$ and the difference in phase between adjacent steps is equal to $2\pi$. The notched lens can be viewed as a combination of a normal lens and a diffractive structure. In the nominal case, i.e. when operating at the first wavelength, the diffractive structure diffracts the incident radiation in a non-zero order, and the combined optical power due to wavelength changes of the normal lens and the diffractive structure is zero. Since the effect of a change in wavelength is different for the lens and the structure, a change to a different, second wavelength may cause a wavefront deviation, such as defocus. Although these structures can make an optical system achromatic as discussed in the article by A. Tudorovskii and in the article SPIE Vol. 2577 (1995) pp 123–129 by K. Maruyama et al., a drawback of these periodic structures is that they in general lead to a rather large number of small zones, making the structures difficult to manufacture. Furthermore, although these gratings can be designed to yield 100% efficiency in the zeroth order diffraction, actual notched lenses based on the above designs never attain such a high efficiency because of manufacturing errors when making the fine zones of these structures.

An example in which a phase structure has been used which has no effect for one particular wavelength is described in EP 0865037 A1 and in the article Applied Optics volume 38 (1999) pp 3778–3786 by R. Katayama, where such a structure is used to make an objective lens designed for scanning DVD record carriers also suitable for scanning CD record carriers. In general, the new DVD record carriers are designed for being scanned with a radiation beam of a wavelength and numerical aperture different from that used for scanning a previous generation of record carrier such as CD. It is desirable that a scanning device for the new record carriers can also scan the older record carriers. The scanning device must therefore be adapted such that it can provide two types of radiation beam, one for each type of record carrier. For example, a device suitable for scanning a record carrier of the so-called DVD type, provides a first radiation beam with a wavelength of 660 nm, a numerical aperture (NA) of 0.6 and a spherical aberration compensation for a record carrier substrate thickness of 0.6 mm. In order to scan previous generation record carriers of the so-called CD type, the device also provides a second radiation beam having a wavelength of 785 nm, and NA of 0.45 and a spherical aberration compensation for a record carrier substrate thickness of 1.2 mm. The device is preferably provided with a single objective system for focussing the radiation beams onto the record carriers in order to keep the manufacturing costs low. The phase structure thereto arranged in the objective system consists of stepped non-periodic annular zones, such that each zone gives rise to a phase step which is equal to a multiple of $2\pi$ for the DVD wavelength (660 nm). For CD read out, however a different wavelength is used (785 nm). Consequently, the stepped phase profile results now in phase steps which no longer are equal to a multiple of $2\pi$. By proper design of the steps heights and zone width, the phase introduced by the phase structure in the CD case reduces the wavefront aberration caused by the disk thickness difference to below the diffraction limit. Although the structure is capable of reducing the wavefront aberration for two discrete wavelengths, it cannot compensate aberrations arising in the system where the wavelength varies over a whole range.

It is an object of the invention to provide an optical element that can be used in an optical scanning device and can transform an incident beam in another beam having different properties in dependence on the wavelength of the incident radiation beam, the optical element having a low radiation loss for the beams.

This object is achieved if, according to the invention, the difference between the first and second wavefront deviation is proportional to the difference between the first wavelength and the second wavelength. Since the amount of the wavelength-dependent aberration increases approximately with the difference between the first and second wavelength, the phase structure will compensate the aberration over a range of wavelengths. In general, the extent of the range is equal to the tolerance range for wavelength changes of the objective lens without compensation multiplied by the factor by which the phase structure reduces the aberrations. The tolerance range is predetermined by the design of the lens to be compensated and the reduction factor is the ratio of the wavefront error of the lens without compensation and the wavefront error of the combination of the lens and the optical element, both at the second wavelength.

It should be noted, that the phase structure according to the invention has a non-periodic pattern, and, therefore, does not form diffraction orders. As a consequence, the phase grating does not have the inherent losses of a grating. The optical element is therefore very suitable for use in an optical head that requires a change in wavefront in dependence on the wavelength of the radiation beam. The optical element introduces the required wavefront changes in dependence on the wavelength of the radiation beam without appreciable loss of radiation energy. In general, the global shape of the phase structure is similar to the shape of the path differences introduced.

In a preferred embodiment of the optical element the differences between the optical paths for the first wavelength are multiples of the first wavelength. In that case the phase structure will not affect the first radiation beam, whereas it will introduce a wavefront deviation in the second radiation beam. Hence, the first wavefront deviation is zero.

A preferred embodiment of the optical element includes at least one difference of optical path equal to two or more times the first wavelength. Although most wavefront deviations can be realised by using step heights between neighbouring areas equal to the first wavelength, the use of step heights of two or more times the first wavelength has the advantage that the number of areas necessary to form the wavefront deviation is reduced and the width of the areas increased. The larger areas facilitate the manufacture of the phase structure, the accuracy of which is limited by the cutting tools used for making the mould for the phase structure. The smaller areas resulting from step heights of one wavelength cannot be manufactured accurately using the current state of the art in cutting tools. The inaccuracy of a phase structure having these smaller areas results in loss of radiation due to scattering. The larger areas according to the invention have a relatively higher accuracy and, consequently, less loss of radiation. The less accurate approximation of the desired wavefront deviation caused by the larger steps results in uncompensated aberrations. These aberration can reduce the quality of a spot formed by the radiation beam on the information layer of an optical record carrier. However, the overall performance of a scanning device using the phase structure having the large steps is better than that of a scanning device using the phase structure having the small steps. Hence by adjusting the width of the zones one can exchange the extent of the wavefront aberration correction and the ease of manufacturing.

In a special embodiment of the optical element the difference between the first and the second wavefront deviation is defocus. Defocus is a wavefront deviation that is quadratic in the radius of the radiation beam. The quadratic form modulo the second wavelength can be approximated by the wavefront steps introduced by the annular areas in the second radiation beam. The change in focal position caused by the defocus can advantageously be used in an optical head of a recorder. Switching of the radiation power between a high and a low level for writing and reading causes a small wavelength change of the radiation beam. The chromatic dispersion of common objective lenses causes a corresponding change in the axial position of the focus spot of the radiation beam. The relative slowness of focus servo systems causes a temporary defocus of the radiation beam on the record carrier when switching from reading power to writing power and vice versa. At shorter wavelengths the problem aggravates, because the defocus becomes larger due to the increased dispersion. If the optical element according to the invention is arranged in the radiation beam, the defocus introduced by the element in the radiation beam because of the change in wavelength can compensate the shift in focus position due to the dispersion of the objective system.

In another special embodiment of the optical element the difference between the first and the second wavefront deviation is spherical aberration. This aberration is preferably used to compensate spherochromatism, i.e. the spherical aberration caused by a lens when it is operated at a wavelength different from its design wavelength. The spherochromatism due to the lens can be compensated by an optical element according to the invention, when the phase structure of the optical element introduces the same amount of spherical aberration as a function of wavelength but with the opposite sign.

The difference between the two wavelengths for the optical elements forming a defocus or spherochromatism wavefront deviation is determined by the change in wavelength of a semiconductor laser. This difference is in general smaller than 20 nm. This should be contrasted with the first and second wavelengths for scanning different types of record carrier, which wavelengths differ by about 125 nm for the CD and DVD types of record carrier. Whereas in the case of scanning of the two types of record carrier the compensation of the wavefront is achieved for two discrete wavelengths, the compensation for the defocus and spherochromatism is achieved over a range of wavelengths, in which range the wavefront deviation introduced by the phase structure depends on the wavelength. In the latter case, the radiation beam of the first wavelength and the radiation beam of the second wavelength are generated by the same radiation source. The first wavelength may lie within the range over which the second wavelength may vary. The first wavelength may lie at one end of the range.

Another case is where the first wavelength is taken to be the averaged value of a batch of lasers which will be used in the system. The second wavelength is then the actual wavelength of the laser, taken from the batch of lasers, which will be mounted in one of the optical heads.

In a preferred embodiment the optical element is a lens, allowing the integration of the optical element with an objective lens. The phase structure may then be applied to one of the surfaces of the lens. Such a lens can be made by known glass or plastic moulding processes or by the so-called replication technique. A plate-shaped optical element can be made in a similar way.

A second aspect of the invention relates to an optical head for scanning an optical record carrier having an information layer, the head comprising a radiation source for generating a first radiation beam having a first wavelength and a second radiation beam having a second wavelength, and an objective system for converging the first radiation beam and the second radiation beam to a focus on the information layer, wherein the optical head comprises an optical element according to the invention for introducing a first wavefront deviation in the first radiation beam and a second wavefront deviation in the second radiation beam.

A third aspect of the invention relates to a device for scanning an optical record carrier having an information layer, the device comprising an optical head according to the invention and an information processing unit for error correction. The improved correction of the radiation beam when its wavelength changes, results in a higher quality signal from the detection system. The higher quality of the signal decreases the demand imposed on the error correction system.

The objects, advantages and features of the invention will be apparent from the following more particular description of preferred embodiments of the invention, as illustrated in the accompanying drawings, in which FIG. 1 shows a scanning device according to the invention;

Figure 1:
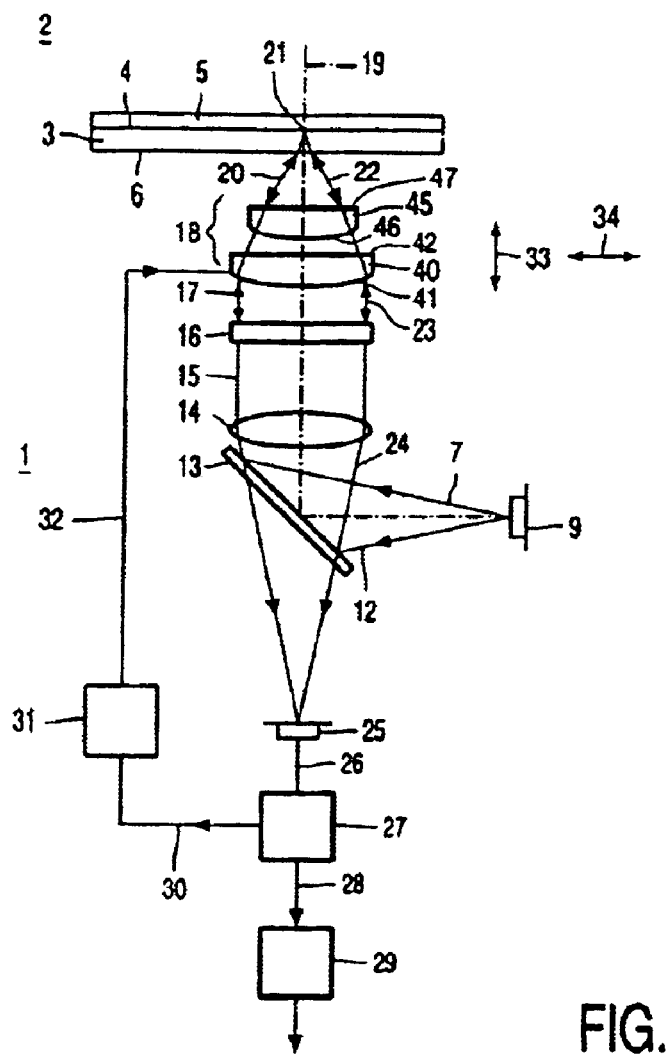

FIG. 1 shows a device 1 for scanning an optical record carrier 2. The record carrier comprises a transparent layer 3, on one side of which an information layer 4 is arranged. The side of the information layer facing away from the transparent layer is protected from environmental influences by a protection layer 5. The side of the transparent layer facing the device is called the entrance face 6. The transparent layer 3 acts as a substrate for the record carrier by providing mechanical support for the information layer. Alternatively, the transparent layer may have the sole function of protecting the information layer, while the mechanical support is provided by a layer on the other side of the information layer, for instance by the protection layer 5 or by a further information layer and a transparent layer connected to the information layer 4. Information may be stored in the information layer 4 of the record carrier in the form of optically detectable marks arranged in substantially parallel, concentric or spiral tracks, not indicated in the Figure. The marks may be in any optically readable form, e.g. in the form of pits, or areas with a reflection coefficient or a direction of magnetisation different from their surroundings, or a combination of these forms.

Radiation sources taken from a batch of radiation sources will in general emit a radiation beam with a wavelength which may differ from one radiation source to an other radiation source. The wavelength characteristic for this batch of radiation sources is called the first wavelength. The characteristic can be the value averaged over all radiation sources from the batch. The second wavelength is the actual wavelength of the radiation source taken from the batch and which is used in the scanning device. The scanning device 1 comprises a radiation source that emits a radiation beam 7 having a second wavelength which may differ from the above defined first wavelength. The radiation source shown in the Figure comprises a semiconductor lasers 9, emitting the radiation beam 7. The radiation beam is used for scanning the information layer 4 of the optical record carrier 2. A beam splitter 13 reflects the diverging radiation beam 12 on the optical path towards a collimator lens 14, which converts the diverging beam 12 into a collimated beam 15. The collimated beam 15 is incident on a transparent optical element 16, which modifies the wavefront of the collimated beam. The beam 17 coming from the optical element 16 is incident on an objective system 18. The objective system may comprise one or more lenses and/or a grating. The objective system 18 has an optical axis 19. The objective system 18 changes the beam 17 to a converging beam 20, incident on the entrance face 6 of the record carrier 2. The objective system has a spherical aberration correction adapted for passage of the radiation beam through the thickness of the transparent layer 3. The converging beam 20 forms a spot 21 on the information layer 4. Radiation reflected by the information layer 4 forms a diverging beam 22, transformed into a substantially collimated beam 23 by the objective system 18 and subsequently into a converging beam 24 by the collimator lens 14. The beam splitter 13 separates the forward and reflected beams by transmitting at least part of the converging beam 24 towards a detection system 25. The detection system captures the radiation and converts it into electrical output signals 26. A signal processor 27 converts these output signals to various other signals. One of the signals is an information signal 28, the value of which represents information read from the information layer 4. The information signal is processed by an information processing unit for error correction 29. Other signals from the signal processor 27 are the focus error signal and radial error signal 30. The focus error signal represents the axial difference in height between the spot 21 and the information layer 4. The radial error signal represents the distance in the plane of the information layer 4 between the spot 21 and the centre of a track in the information layer to be followed by the spot. The focus error signal and the radial error signal are fed into a servo circuit 31, which converts these signals to servo control signals 32 for controlling a focus actuator and a radial actuator respectively. The actuators are not shown in the Figure. The focus actuator controls the position of the objective system 18 in the focus direction 33, thereby controlling the actual position of the spot 21 such that it coincides substantially with the plane of the information layer 4. The radial actuator controls the position of the objective lens 18 in a radial direction 34, thereby controlling the radial position of the spot 21 such that it coincides substantially with the central line of track to be followed in the information layer 4. The tracks in the Figure run in a direction perpendicular to the plane of the Figure.

The objective system 18 in FIG. 1 consist in this example of two elements, a first lens 40 and a second lens 45 arranged between the lens 40 and the position of the record carrier 2. The objective system 18 changes the parallel beam 17 with a first wavelength of 405 nm into a converging beam with NA=0.85, which forms through the transparent layer 3 a spot 21 on the information layer 4. The free working distance, i.e. the distance between the lens 45 facing the disk and the disk is 0.15 mm. The transparent layer 3 has a thickness of 0.1 mm and is made of polycarbonate having a refractive index n=1.6233 at the first wavelength and an Abbe number of 30. The first lens 40 has a thickness on the optical axis of 2.319 mm and an entrance pupil diameter of 3.0 mm. The body of the lens is made of FK5 Schott glass with refractive index n=1.4989 and Abbe number 70.4. The convex surface of the lens body, directed towards the collimator lens, has a radius of 2.07 nm. The surface 42 is flat. The aspherical shape is realized in a thin layer of an acrylic lacquer on top of the glass body. The lacquer has a refractive index n=1.5987 with Abbe number 30. The thickness of this layer on the optical axis is 19 microns. The rotational symmetric aspherical shape is given by the equation $$z(r) = \sum_{i=1}^{8} B_{2i} r^{2i}$$

with z the position of the surface in the direction of the optical axis in millimeters, r the distance to the optical axis in millimeters, and $B_k$ the coefficient of the k-th power of r. The value of the coefficients $B_2$ until $B_{16}$ are 0.26447094, 0.0088460392, 0.00014902273, 0.0014305415, −0.0015440542, 0.00082680417, −0.00023319199, 2.5911741·10$^{-5}$, respectively.

The distance on the optical axis between the first lens 40 and the second lens 45 is 0.3556 mm. The second lens 45 facing the disk has a thickness on the optical axis of 0.977 mm. The lens body of the lens is made of FK5 Schott glass with refractive index n=1.4989 and Abbe number 70.4. The convex surface of the lens body which is directed towards the collimator lens has a radius of 0.85 mm. The surface 47 is flat. The aspherical shape is realized in a thin layer of an acrylic lacquer on top of the glass body. The lacquer has a refractive index n=1.5987 with Abbe number 30. The thickness of this layer on the optical axis is 7 microns. The rotational symmetric aspherical shape is given by the equation $$z(r) = \sum_{i=1}^{8} B_{2i} r^{2i}$$

with z the position of the surface in the direction of the optical axis in millimeters, r the distance to the optical axis in millimeters, and $B_k$ the coefficient of the k-th power of r. The value of the coefficients $B_2$ until $B_{16}$ are 0.6052026, 0.21991899, 0.12419616, 0.023176954, 0.15057964, 0.56573255, −1.2308544, 0.73899785, respectively.

The device of FIG. 1 is designed for operation at the first wavelength of 405 nm. Using a second wavelength different from the first wavelength for which the objective was optimised will in general give rise to a certain amount of spherochromatism, hence a certain amount of spherical aberration proportional to the difference in wavelength between the actual wavelength (second wavelength) and the design wavelength (first wavelength). However, the optical element 16 according to the invention introduces a compensating wavefront deviation when the radiation beam, having the second wavelength passes through it. The wavefront deviation has the form of spherical aberration and the amount of spherical aberration is proportional to the difference between the actual wavelength (second wavelength) and the design wavelength (first wavelength). The amount of spherical aberration in the radiation beam 17 incident on the objective system is chosen such, that the combined spherical aberration due to the wavelength change introduced in the radiation beam by the optical element 16 and the objective system 18 substantially compensate one another. Since both the spherical introduced by the optical element 16 and the objective system 18 are proportional to the wavelength difference, this compensation occurs for a whole range of the second wavelength emitted by the various radiation sources.

Figure 2:
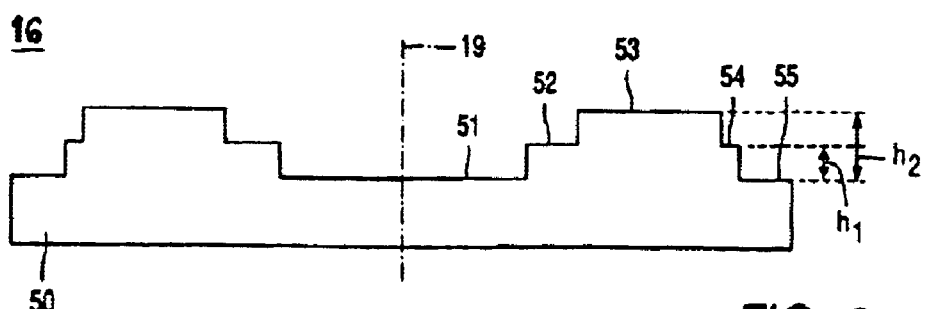
FIG. 2 shows a cross-section of the optical element.

FIG. 2 shows a cross-section of the optical element 16. The optical element comprises a transparent plate 50, one surface of which is a phase structure, which is rotationally symmetric around the optical axis 19. The phase structure has a central area 51 and four concentric annular areas 52, 53, 54 and 55. The annular areas 52 and 54 are rings with a height of $h_1$ above the height of the central area 51. The annular area 53 is a ring with a height of $h_2$ above the height of the central area. The height of the areas in the Figure is exaggerated with respect to the thickness and radial extent of the plate 50. The annular area 55 has the same height as the central area 51. The heights $h_1$ and $h_2$ are each an integer multiple m times a height h given by $$h = \frac{\lambda_1}{n_1 - 1}$$

where $\lambda_1$ is the first (design) wavelength and $n_1$ is the refractive index of the material of the annular area at the wavelength $\lambda_1$. Since each of the annular zones introduces a phase change of a multiple of $2\pi$ in the first radiation beam, the phase structure does not change the wavefront of the first radiation beam.

The radiation beam of a particular radiation source from a batch of radiation sources, has a wavelength $\lambda_2$ which may different from the design wavelength $\lambda_1$. The wavefront of this radiation beam will be affected by the optical element, because the phase changes introduced by the annular areas are not equal to multiples of $2\pi$. This difference in phase $\Delta\phi$ for a step height h is given by $$\Delta\phi = 2\pi\left(\frac{\lambda_1(n_1 + \Delta n - 1)}{\lambda_2(n_1 - 1)} - 1\right) \approx -2\pi\frac{\lambda_2 - \lambda_1}{\lambda_1}$$

where n1 is the refractive index at the wavelength $\lambda_1$ and $\Delta n$ the change in refractive index if the wavelength is changed from $\lambda_1$ to $\lambda_2$. The approximation in the formula is based on the assumption that $\Delta n$ is negligibly small compared to the remaining term proportional to $\lambda_2-\lambda_1$.

As an example, the design (first) wavelength is again $\lambda_1$=405 nm and the actual (second) wavelength of the radiation beam $\lambda_2$=415 nm. As a result of the difference of 10 nm in wavelength the objective 18 induces 33.7 m$\lambda$ RMS spherical wavefront aberration. The phase structure in the example is made of Diacryl having a refractive index n=1.59869 at a wavelength of 405 nm. The height of a phase step in the phase structure giving rise to a $2\pi$ step in phase at $\lambda_1$ is then h=0.6765 $\mu$m. A proper design of the step heights h and the corresponding width of each of the rings in the phase structure can reduce the spherical aberration considerably. In a specific embodiment of the phase structure the value of m for the areas 51 to 55 is equal to 0, 2, 4, 2 and 0, respectively, and the radial extent of the annular areas 52 to 55 expressed as a radius normalised on the radius of the second radiation beam at the axial position of the optical element 26 is from 0.267 to 0.493, 0.493 to 0.873, 0.873 to 0.953 and 0.953 to 1.00, respectively.

Figure 3:
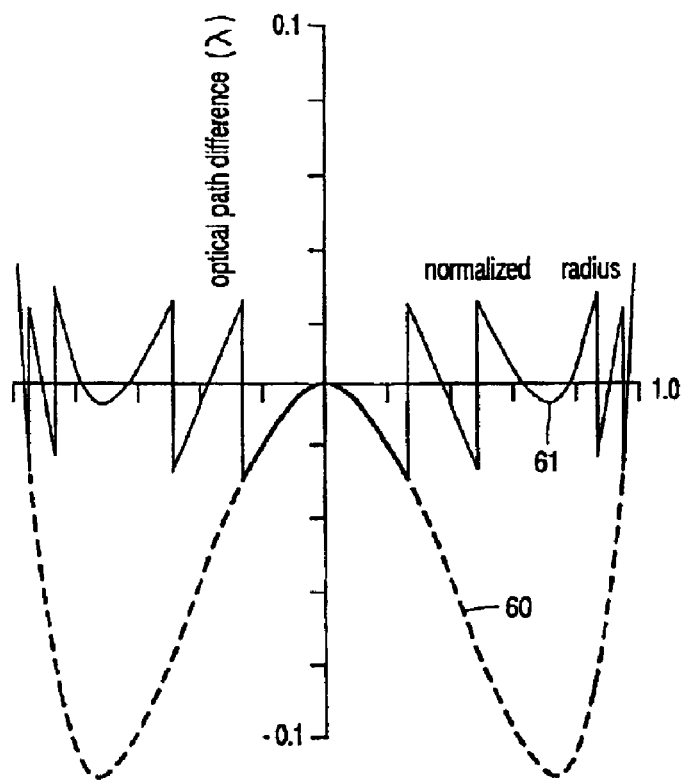
FIG. 3 shows the wavefront aberration near the focal spot versus the normalised radius of the radiation beam.

The stepped wavefront deviation introduced by the optical element is an approximation of the desired spherical aberration. FIG. 3 shows the wavefront aberration near the focal spot 47 in wavelengths $\lambda_2$ versus the normalised radius of the radiation beam. The dashed line 60 represents the wavefront aberration for the case the optical element 16 does not introduce a wavefront deviation in the second radiation beam. The drawn line 61 represents the remaining wavefront aberration for the case the optical element has the above-mentioned phase structure. The wavefront aberration of the total system is now reduced from 33.7 m$\lambda$ RMS spherical wavefront aberration to 12.5 m$\lambda$ RMS, hence a reduction of a factor of 2.7. Although we have considered the case where $\lambda_2$=415 nm (hence $\Delta\lambda$=10 nm), the same reduction factor is obtain for any other wavelength value for $\lambda_2$, since both the contribution to the spherical aberration due to the objective lens 18 and that due to the phase structure 16 is proportional to the wavelength difference ($\lambda_2-\lambda_1$).

Figure 4:
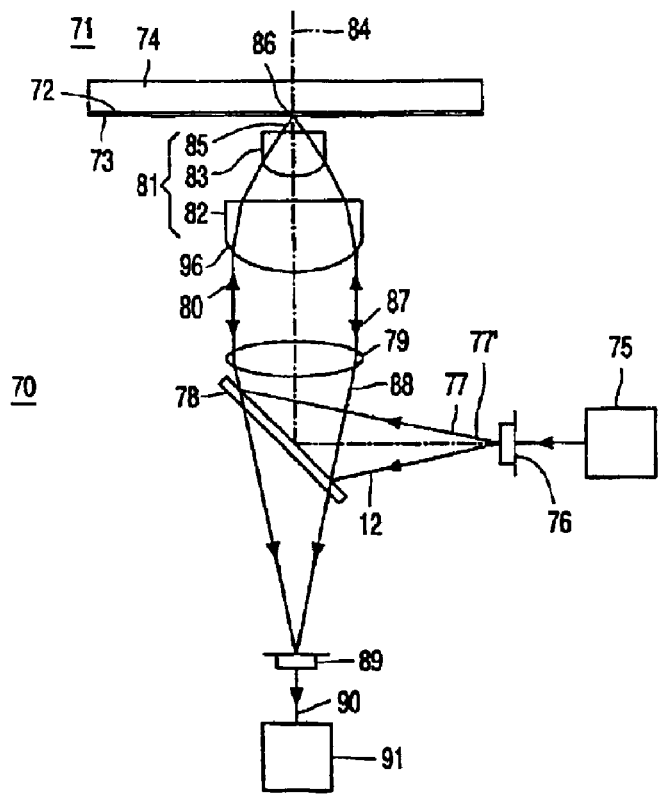
FIG. 4 shows a second embodiment of the scanning device according to the invention.

FIG. 4 shows an embodiment 70 of the scanning device according to the invention for reading and writing on a high-density record carrier 71. The record carrier comprises a writeable information layer 72, protected on the radiation-incident side by a 100 $\mu$m thick transparent layer 73. A substrate 74 on the other side of the information layer provides mechanical strength to the record carrier. The device 70 comprises a control circuit 75 for controlling the output power of a radiation source 76, in particular between a read level and a higher write level. The radiation source is a semiconductor laser providing a first diverging radiation beam 77 at a wavelength of 405 nm when operating at the read level and a second radiation beam 77' at a wavelength of 407 nm when operating at the write level. Alternatively, the wavelength at the read level is 407 nm and at the write level 405 nm. A beam splitter 78 reflects the diverging radiation beam 77 towards a collimator lens 79, which converts the diverging beam 77 into a collimated beam 80. The collimated beam 80 is incident on an objective system 81, comprising a first lens 82 and a second lens 83, and having an NA of 0.85. The objective system 81 has an optical axis 84. The objective system 81 changes the beam 80 to a converging beam 85, incident on the record carrier 71. The objective system has a spherical aberration correction adapted for passage of the radiation beam through the thickness of the transparent layer 73. The converging beam 85 forms a focal spot 86 on the information layer 72. Radiation reflected by the information layer 72 forms a diverging beam, transformed into a substantially collimated beam 87 by the objective system 81 and subsequently into a converging beam 88 by the collimator lens 79. The beam splitter 78 separates the forward and reflected beams by transmitting at least part of the converging beam 88 towards a detection system 89. The detection system captures the radiation and converts it into electrical output signals 90. A signal processor 91 converts these output signals to various other signals, similar to the signal processor 27 in FIG. 1.

Figure 5:
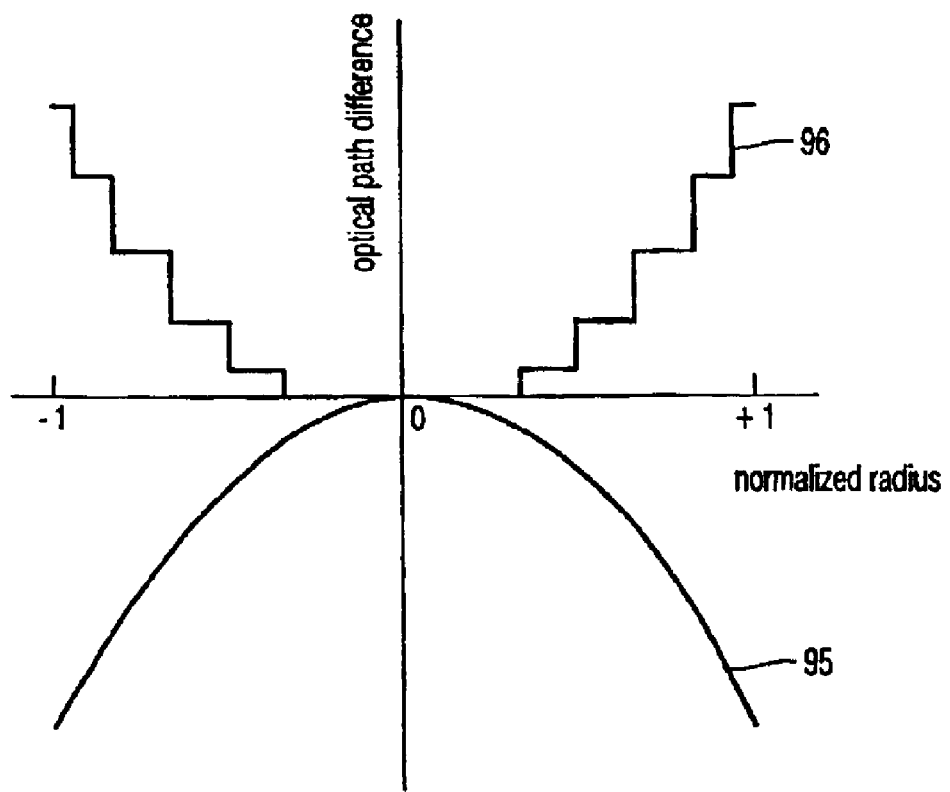
FIG. 5 shows a cross-section of the wavefront of the radiation beam near the focal spot.

The dispersion of a specific design of the objective system 81 causes a defocus of 0.36 μm, corresponding to 120 mλ RMS, when the wavelength of the radiation beam 80 changes by Δλ equal to 2 nm on changing the radiation power from the reading level to the writing level. It should be noted that the focal depth $\lambda/(2NA^2)$ is only 0.28 μm. FIG. 5 shows a cross-section of the wavefront of the radiation beam near the focal spot 86 as a function of the normalised radius in the radiation beam; the defocus is represented by line 95.

Figure 6:
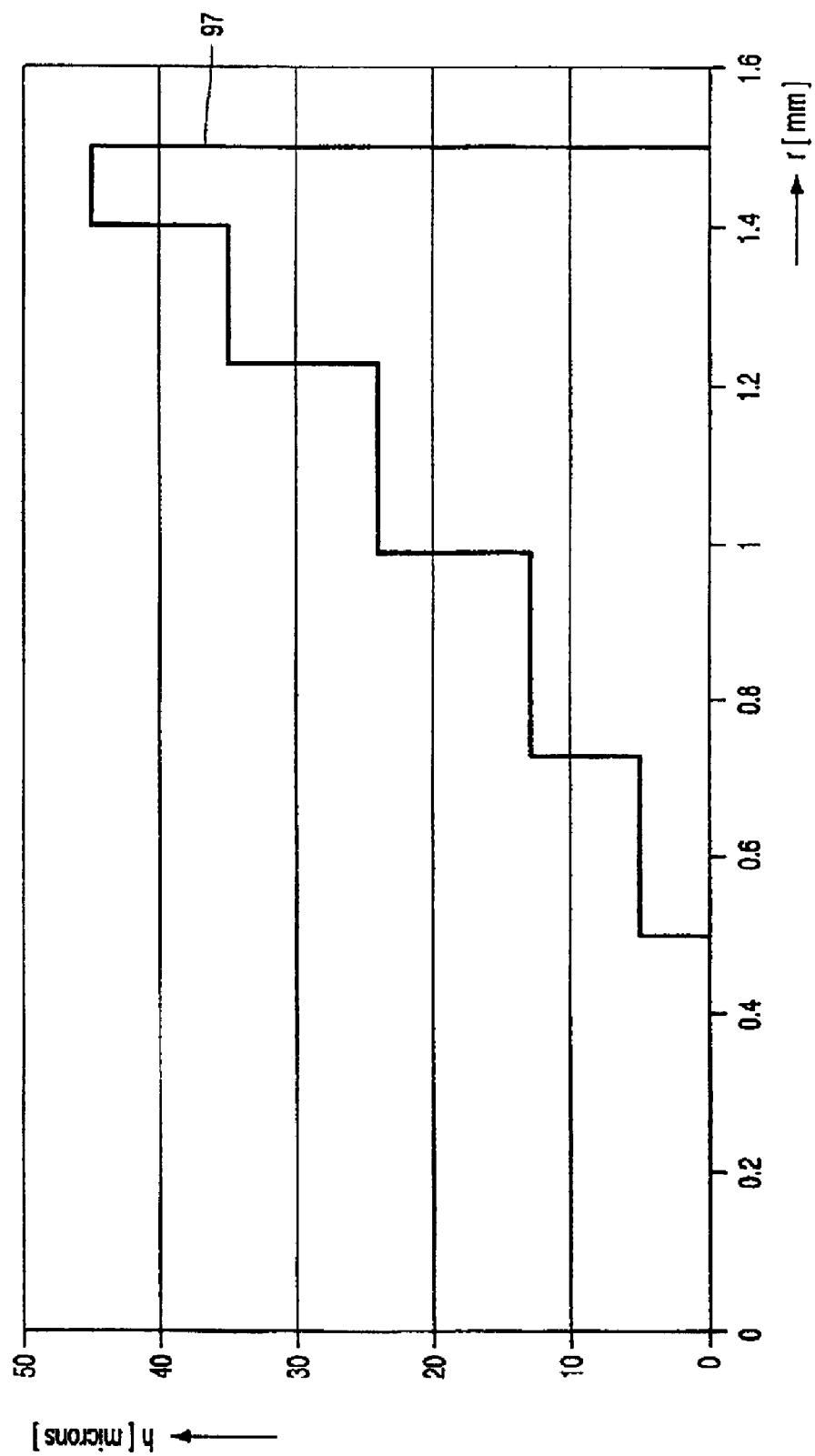
FIG. 6 shows a cross-section of the phase structure used in the second embodiment.

The objective system is achromatised by providing the device 70 with a phase structure 97 according to the invention. The phase structure is arranged on the surface 86 of the first lens 82 of the objective system, being the surface on which the collimated beam 80 is incident. The phase structure comprises five annular areas and a central area, the height of which increases stepwise from the centre of the structure to the outer radius of the radiation beam. FIG. 6 shows a cross-section of the phase structure from its centre on the optical axis 84 to the outer radius at 1.5 mm. The structure is made of Diacryl and applied to the body of the lens 82 by the replication technique. The phase structure may be incorporated in the aspheric mould for making the aspheric surface 86. The refractive index n of Diacryl is equal to 1.59869 at a wavelength of 405 nm. The radii of the annular areas, the height of the each area and the relative phase of the radiation beam after passage through the area are given in Table I.

TABLE I

| begin area (mm) | end area (mm) | height m*h (μm) | m | relative phase (radians) |
|---|---|---|---|---|
| 0.0 | 0.5 | 0 | 0 | 0 |
| 0.5 | 0.73 | 4.7355 | 9 | −0.2793 |
| 0.73 | 0.99 | 15.5595 | 23 | −0.7136 |
| 0.99 | 1.23 | 27.7365 | 41 | −1.2722 |
| 1.23 | 1.40 | 39.9135 | 59 | −1.8307 |
| 1.40 | 1.50 | 50.0610 | 74 | −2.2961 |

The values in Table I, calculated for a phase structure on a plane surface, will be slightly modified, if the obliqueness of the lens surface is taken into account. The height of each area is an integral multiple m of a height h equal to 0.6765 μm, being the height that causes a relative phase of 2π for the wavelength of 405 nm. Hence, the phase structure does not affect the wavefront of the first radiation beam 77. When the wavelength changes by Δλ, a step height of h introduces a relative phase φ equal to $$\Delta\phi = 2\pi\left(\frac{\lambda_1(n_1 + \Delta n - 1)}{\lambda_2(n_1 - 1)} - 1\right) \approx -2\pi\frac{\lambda_2 - \lambda_1}{\lambda_1}$$

Since $\Delta n/\Delta\lambda = -3.3 \cdot 10^{-4}$ nm$^{-1}$ for Diacryl, the effect of the change Δn of the refractive index on φ is an order of magnitude smaller than the effect of the wavelength change. The right-most column of Table I gives the relative phases calculated according to the equal sign. The stepped wavefront introduced by the phase structure in the radiation beam 77' is shown in FIG. 5 as line 96. The wavefront approximates the defocus 95 caused by the dispersion of the objective system 81 but with different sign. Since the stepped wavefront is an approximation, the compensation of the defocus will not be perfect, and a rest wavefront error of 22 mλ RMS of higher order terms remains in the radiation beam 85 near the focal spot 86. The phase structure 97 compensates the change in position of the focal spot due to the dispersion of the objective system when changing from read level to write level power, thereby reducing the RMS wavefront error from 120 to 22 mλ. The 22 mλ wavefront error is due to the not perfect compensation of the phase structure.

Although the reduction of the defocus by a factor of about 6 is determined for a wavelength shift of 2 nm, the reduction applies to a larger range of wavelength shifts, because both the defocus introduced by the objective system 81 and the defocus introduced by the non-periodic phase structure is proportional to the shift in wavelength. In general, the use of the phase structure increases the tolerance range of the objective system by factor equal to the reduction factor. If in this example the objective system without compensation is designed to work properly for a wavelength range from 400 nm to 410 nm, the compensation by the phase structure will increase the range by a factor of 6 to 375–435 nm. In the first example the reduction factor for spherochromatism was 2.7, and the tolerance range from 400 nm to 410 nm of the objective system will be increased to 392–418 nm. At greater wavelength differences effects not linear in the wavelength difference may become important, such as the wavelength dependence of the refractive index, which may limit the range within which the wavelength may vary.

The dispersion compensation of the phase structure allows the use of higher-dispersion glass for the lenses of the objective system, which are in general cheaper. Since the phase structure can be incorporated in the mould for the lens 82, the phase structure does not add to the cost of the scanning device.

The optical element comprising the phase structure may be used to asperochromatise or achromatize an optical system. For example, when the objective system comprises a grating, the phase structure can be used to compensate the dispersion of the grating. Although the described embodiments of the optical element are used in transmission, it will be clear that the invention is also applicable to optical elements used in reflection.

What is claimed is:

1. An optical element for interacting with a first radiation beam having a first wavelength and a second radiation beam having a different, second wavelength and introducing a first wavefront deviation in the first radiation beam and a second wavefront deviation in the second radiation beam, the optical element having a surface in the path of the first and second radiation beam, the surface comprising a phase structure in the form of annular areas, the areas forming a non-periodic pattern of optical paths of different length, the optical paths for the first wavelength forming the first wavefront deviation and the optical paths for the second wavelength forming the second wavefront deviation, characterised in that the difference between the first and second wavefront deviation is proportional to the difference between the first wavelength and the second wavelength.

2. Optical element according to claim 1, wherein the differences between the optical paths for the first wavelength are multiples of the first wavelength.

3. Optical element according to claim 2, wherein at least one of the multiples is equal to two or larger.

4. Optical element according to claim 1, wherein the difference between the first and the second wavefront deviation is defocus.

5. Optical element according to claim 1, wherein the difference between the first and the second wavefront deviation is spherical aberration.

6. Optical element according to claim 1, wherein the element is a lens.

7. Optical element according to claim 1, wherein the element comprises at least a grating.

8. Optical element according to claim 1, wherein the element comprises at least a grating and a lens.

9. An optical head for scanning an optical record carrier having an information layer, the head comprising a radiation source for generating a fist radiation beam having a first wavelength and a second radiation beam having a second wavelength, and an objective system for converging the first radiation beam and the second radiation beam to a focus on the information layer, characterized in that the optical head comprises an optical element according to claim 1 for introducing a wavefront deviation in the second radiation beam.

10. A device for scanning an optical record carrier having an information, the device comprising an optical head according to claim 9 and an information processing unit for error correction.

11. The optical head according to claim 9, wherein the first waveform deviation and the second wavefront deviation are spherical aberrations are that cancel spherical aberrations caused by the objective system.

* * * * *